US012026290B2

(12) United States Patent
Bhunia et al.

(10) Patent No.: US 12,026,290 B2
(45) Date of Patent: Jul. 2, 2024

(54) STEGANOGRAPHY OF HARDWARE INTELLECTUAL PROPERTY

(71) Applicant: University of Florida Research Foundation, Incorporated, Gainesville, FL (US)

(72) Inventors: Swarup Bhunia, Gainesville, FL (US); Abdulrahman Alaql, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 335 days.

(21) Appl. No.: 17/589,040

(22) Filed: Jan. 31, 2022

(65) Prior Publication Data
US 2022/0253563 A1   Aug. 11, 2022

Related U.S. Application Data

(60) Provisional application No. 63/199,966, filed on Feb. 5, 2021.

(51) Int. Cl.
*G06F 30/30* (2020.01)
*G06F 21/75* (2013.01)
(Continued)

(52) U.S. Cl.
CPC .............. *G06F 21/75* (2013.01); *G06F 30/30* (2020.01); *G06F 2115/08* (2020.01); *G06F 2117/08* (2020.01)

(58) Field of Classification Search
None
See application file for complete search history.

(56) References Cited

U.S. PATENT DOCUMENTS

| 7,017,043 | B1 * | 3/2006 | Potkonjak | ............. | G06T 1/0021 |
| | | | | | 713/181 |
| 8,402,401 | B2 * | 3/2013 | Chakraborty | ............ | G09C 1/00 |
| | | | | | 713/193 |
| 2022/0198108 | A1 * | 6/2022 | Bhunia | ................... | G06F 30/34 |

OTHER PUBLICATIONS

A. Sengupta et al., "Crypto-Based Dual-Phase Hardware Steganography for Securing IP cores" IEEE Letters of the Computer Society, vol. 2, No. 4, Oct.-Dec. 2019, pp. 32-35. (Year: 2019).*

(Continued)

*Primary Examiner* — Leigh M Garbowski
(74) *Attorney, Agent, or Firm* — ALSTON & BIRD LLP

(57) ABSTRACT

In general, embodiments of the present disclosure provide methods, apparatus, systems, computer program products, computing devices, and computing entities for modifying a design of a hardware IP. According to one embodiment, a method is provided, the method including generating a control and data flow graph (CDFG) representation for portions of the design. The method further includes partitioning the CDFG representation into a set of partitioned sub-graphs. The method further includes, for each partitioned sub-graph, generating a merged sub-graph to form a set of merged sub-graphs. Generating the merged sub-graph for each partitioned sub-graph involves generating a container sub-graph and merging the container sub-graph with the partitioned sub-graph to form the merged sub-graph. The container sub-graph may be a modification of the partitioned sub-graph with respect to an identified feature, in some examples. The method further includes synthesizing a modified design of the hardware IP including the set of merged sub-graphs.

20 Claims, 10 Drawing Sheets

(51) Int. Cl.
　　　*G06F 115/08*　　　(2020.01)
　　　*G06F 117/08*　　　(2020.01)

(56) References Cited

OTHER PUBLICATIONS

A. Sengupta et al., "IP Core Steganography for Protecting DSP Kernels Used in CE Systems" IEEE Transactions on Consumer Electronics, vol. 65, No. 4, Nov. 2019, pp. 506-515. (Year: 2019).*
M. Rathor et al., "IP Core Steganography Using Switch Based Key-Driven Hash-Chaining and Encoding for Securing DSP Kernels Used in CE Systems" IEEE Trans. on Consumer Electronics, vol. 66, No. 3, Aug. 2020, pp. 251-260. (Year: 2020).*

\* cited by examiner

STEGANOGRAPHY OF HARDWARE INTELLECTUAL PROPERTY

CROSS-REFERENCE TO RELATED APPLICATIONS

This application claims priority to U.S. Provisional Patent Application Ser. No. 63/199,966 filed on Feb. 5, 2021, which is incorporated herein by reference in its entirety, including any figures, tables, drawings, and appendices.

TECHNICAL FIELD

The present application relates generally to hardware intellectual property security through locking a design of a hardware intellectual property and hiding its functionality by performing a merging that intelligently combines two or more hardware intellectual properties into one.

BACKGROUND

The ability of the semiconductor industry to design, manufacture, and market innovative products in an ever-decreasing production time and reduced cost has resulted in the rapid expansion of human dependency on electronic systems. This significant cutback of production time and cost has been achieved by outsourcing various supply chain stages to specialized third parties across the globe. When a design house or intellectual property (IP) vendor sends a hardware IP to an untrusted party, e.g., an untrusted foundry, it is vulnerable to various attacks, including piracy, reverse-engineering, and malicious alteration. Traditional protection techniques such as encryption, which work well in preventing certain attacks for software IPs, have been considered. However, these techniques are often inapplicable for hardware IPs due to the requirement of white-box accessibility by untrusted vendors during the design, verification, integration, and fabrication process.

Therefore, a need exists in the art for improved security for hardware IP to protect against piracy, reverse-engineering, and malicious alterations. It is with respect to these considerations and others that the disclosure herein is presented.

BRIEF SUMMARY

Embodiments of the present disclosure provide methods, apparatus, systems, computer program products, computing devices, and computing entities for modifying a design of a hardware IP, with modified designs having improved security against piracy, reverse-engineering, and malicious alterations. According to one aspect of the present disclosure, a method for modifying a design of a hardware IP is provided. The method includes generating a control and data flow graph (CDFG) representation for each of one or more functions of the design. The method further includes partitioning the CDFG representation into a set of partitioned sub-graphs. The method further includes, for each partitioned sub-graph, generating a merged sub-graph to form a set of merged sub-graphs. The merged sub-graph is generated based at least in part on performing an analysis on the partitioned sub-graph to identify at least one feature of one or more structural features and/or one or more functional features for the partitioned sub-graph. The merged sub-graph is generated further based at least in part on generating a container sub-graph for the partitioned sub-graph based at least in part on the at least one feature. The merged sub-graph is generated further based at least in part on merging the partitioned sub-graph and the container sub-graph to generate the merged sub-graph. The method further includes synthesizing a modified design of the hardware IP. The modified design includes the set of merged sub-graphs.

In various embodiments, partitioning the CDFG representation includes using a partitioning algorithm configured to minimize cut edges of the set of partitioned sub-graphs. In various embodiments, the at least one feature includes at least one of types of operations, a number of possible branches, or a number of constants and variables integrated in the partitioned sub-graph. In various embodiments, the container sub-graph includes at least one of a randomly generated sub-graph, a modification of the partitioned sub-graph, or a sub-graph retrieved from a data storage. In various embodiments, merging the partitioned sub-graph and the container sub-graph is performed using a K-way graph merging algorithm. In various embodiments, merging the partitioned sub-graph and the container sub-graph is performed by implementing a key-based selector configured to control activation of functionality represented by the partitioned sub-graph or functionality represented by the container sub-graph. In various embodiments, merging the partitioned sub-graph and the container sub-graph is performed by implementing one or more derived keys, and functionality represented an end of the partitioned sub-graph regenerates the one or more derived keys based at least in part on an inserted key.

In various embodiments, generating a merged sub-graph is further based at least in part on performing a data-path locking on the merged sub-graph. In various embodiments, performing the data-path locking on the merged CDFG sub-graph includes adding a key dependency on at least one existing value so that the at least one existing value is restored only if a key is correctly applied According to another aspect of the present disclosure, an apparatus for modifying a design of a hardware IP is provided. The apparatus includes at least one processor and a memory including computer executable instructions. The memory and the computer executable instructions are configured to, with the at least one processor, cause the apparatus to generate a control and data flow graph (CDFG) representation for each of one or more functions of the design. The memory and the computer executable instructions are further configured to, with the at least one processor, cause the apparatus to partition the CDFG representation into a set of partitioned sub-graphs. The memory and the computer executable instructions are configured to, with the at least one processor, cause the apparatus to generate, for each partitioned sub-graph, a merged sub-graph to form a set of merged sub-graphs. The merged sub-graph is generated based at least in part on performing an analysis on the partitioned sub-graph to identify at least one feature of one or more structural features and/or one or more functional features for the partitioned sub-graph. The merged sub-graph is generated further based at least in part on generating a container sub-graph for the partitioned sub-graph based at least in part on the at least one feature. The merged sub-graph is generated further based at least in part on merging the partitioned sub-graph and the container sub-graph to generate the merged sub-graph. The memory and the computer executable instructions are configured to, with the at least one processor, cause the apparatus to synthesize a modified design of the hardware IP. The modified design includes the set of merged sub-graphs.

In various embodiments, partitioning the CDFG representation includes using a partitioning algorithm configured to minimize cut edges of the set of partitioned sub-graphs. In various embodiments, the at least one feature includes at least one of types of operations, a number of possible branches, or a number of constants and variables integrated in the partitioned sub-graph. In various embodiments, the container sub-graph includes at least one of a randomly generated sub-graph, a modification of the partitioned sub-graph, or a sub-graph retrieved from a data storage. In various embodiments, merging the partitioned sub-graph and the container sub-graph is performed using a K-way graph merging algorithm. In various embodiments, merging the partitioned sub-graph and the container sub-graph is performed by implementing a key-based selector configured to control activation of functionality represented by the partitioned sub-graph or functionality represented by the container sub-graph. In various embodiments, merging the partitioned sub-graph and the container sub-graph is performed by implementing one or more derived keys, and functionality represented an end of the partitioned sub-graph regenerates the one or more derived keys based at least in part on an inserted key.

In various embodiments, generating a merged sub-graph is further based at least in part on performing a data-path locking on the merged sub-graph. In various embodiments, performing the data-path locking on the merged CDFG sub-graph includes adding a key dependency on at least one existing value so that the at least one existing value is restored only if a key is correctly applied.

According to yet another aspect of the present disclosure, a computer program product for modifying a design of a hardware IP is provided. The computer program product includes at least one computer-readable storage medium having computer-readable program code portions stored therein. The computer-readable program code portions include executable portions configured to cause at least one processor to generate a control and data flow graph (CDFG) representation for each of one or more functions of the design. The computer-readable program code portions include executable portions further configured to cause at least one processor to partition the CDFG representation into a set of partitioned sub-graphs. The computer-readable program code portions include executable portions further configured to cause at least one processor to generate, for each partitioned sub-graph, a merged sub-graph to form a set of merged sub-graphs. The merged sub-graph is generated based at least in part on performing an analysis on the partitioned sub-graph to identify at least one feature of one or more structural features and/or one or more functional features for the partitioned sub-graph. The merged sub-graph is generated further based at least in part on generating a container sub-graph for the partitioned sub-graph based at least in part on the at least one feature. The merged sub-graph is generated further based at least in part on merging the partitioned sub-graph and the container sub-graph to generate the merged sub-graph. The computer-readable program code portions include executable portions further configured to cause at least one processor to synthesize a modified design of the hardware IP. The modified design includes the set of merged sub-graphs.

In various embodiments, partitioning the CDFG representation includes using a partitioning algorithm configured to minimize cut edges of the set of partitioned sub-graphs. In various embodiments, the at least one feature includes at least one of types of operations, a number of possible branches, or a number of constants and variables integrated in the partitioned sub-graph. In various embodiments, the container sub-graph includes at least one of a randomly generated sub-graph, a modification of the partitioned sub-graph, or a sub-graph retrieved from a data storage. In various embodiments, merging the partitioned sub-graph and the container sub-graph is performed using a K-way graph merging algorithm. In various embodiments, merging the partitioned sub-graph and the container sub-graph is performed by implementing a key-based selector configured to control activation of functionality represented by the partitioned sub-graph or functionality represented by the container sub-graph. In various embodiments, merging the partitioned sub-graph and the container sub-graph is performed by implementing one or more derived keys, and functionality represented an end of the partitioned sub-graph regenerates the one or more derived keys based at least in part on an inserted key.

In various embodiments, generating a merged sub-graph is further based at least in part on performing a data-path locking on the merged sub-graph. In various embodiments, performing the data-path locking on the merged CDFG sub-graph includes adding a key dependency on at least one existing value so that the at least one existing value is restored only if a key is correctly applied.

BRIEF DESCRIPTION OF THE DRAWINGS

Figure 1:
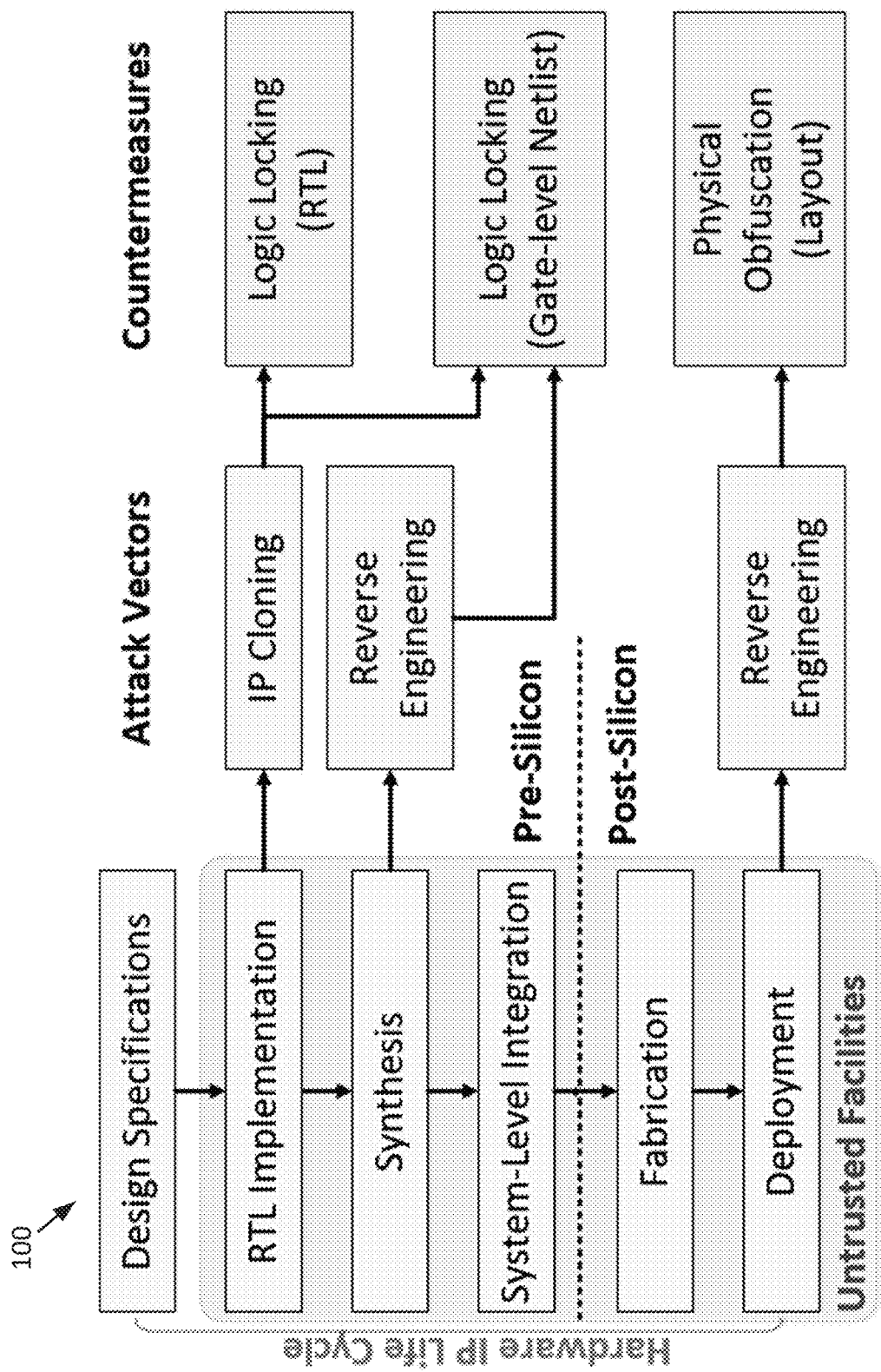
Figure 2:
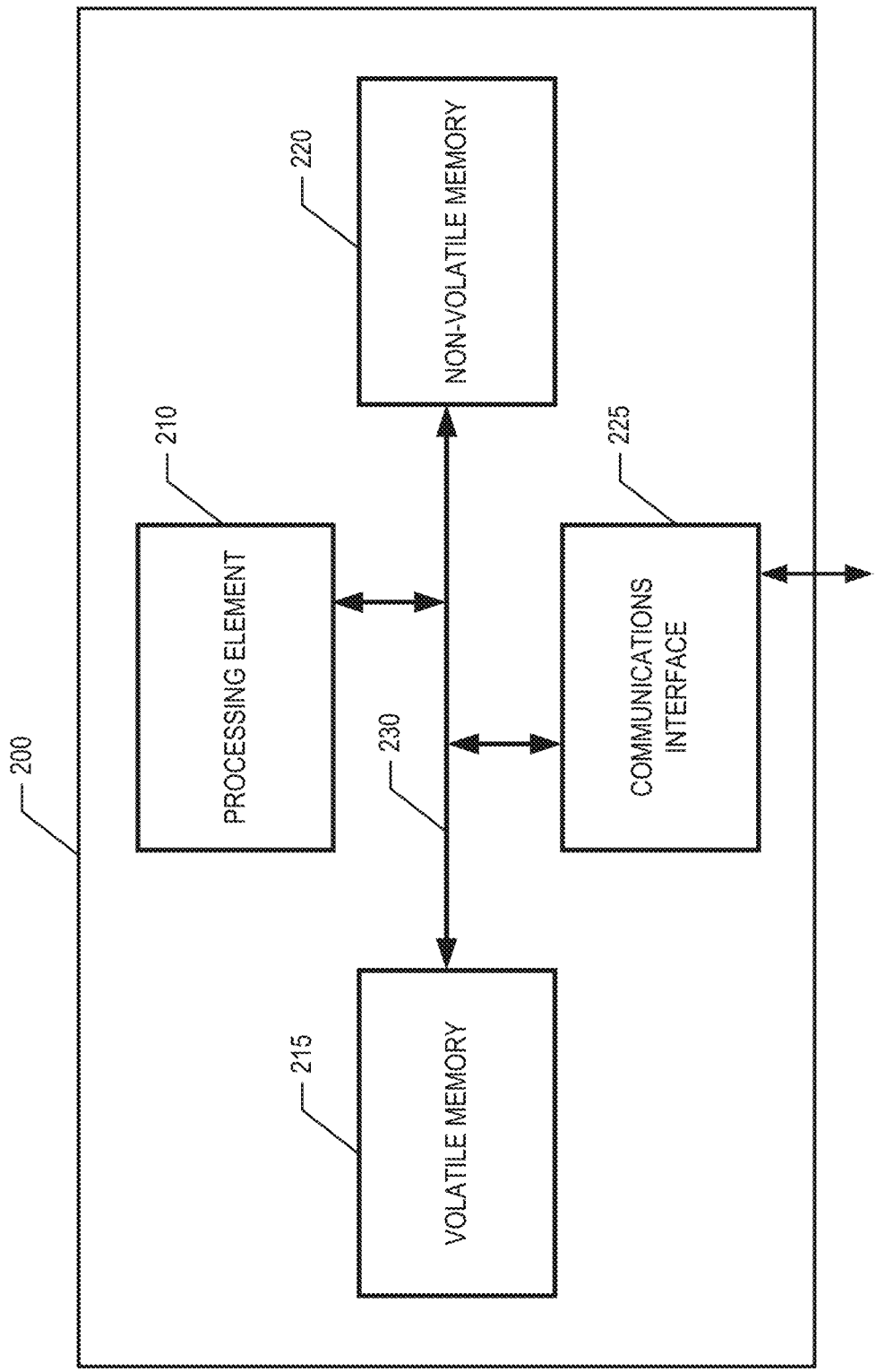
Figure 3:
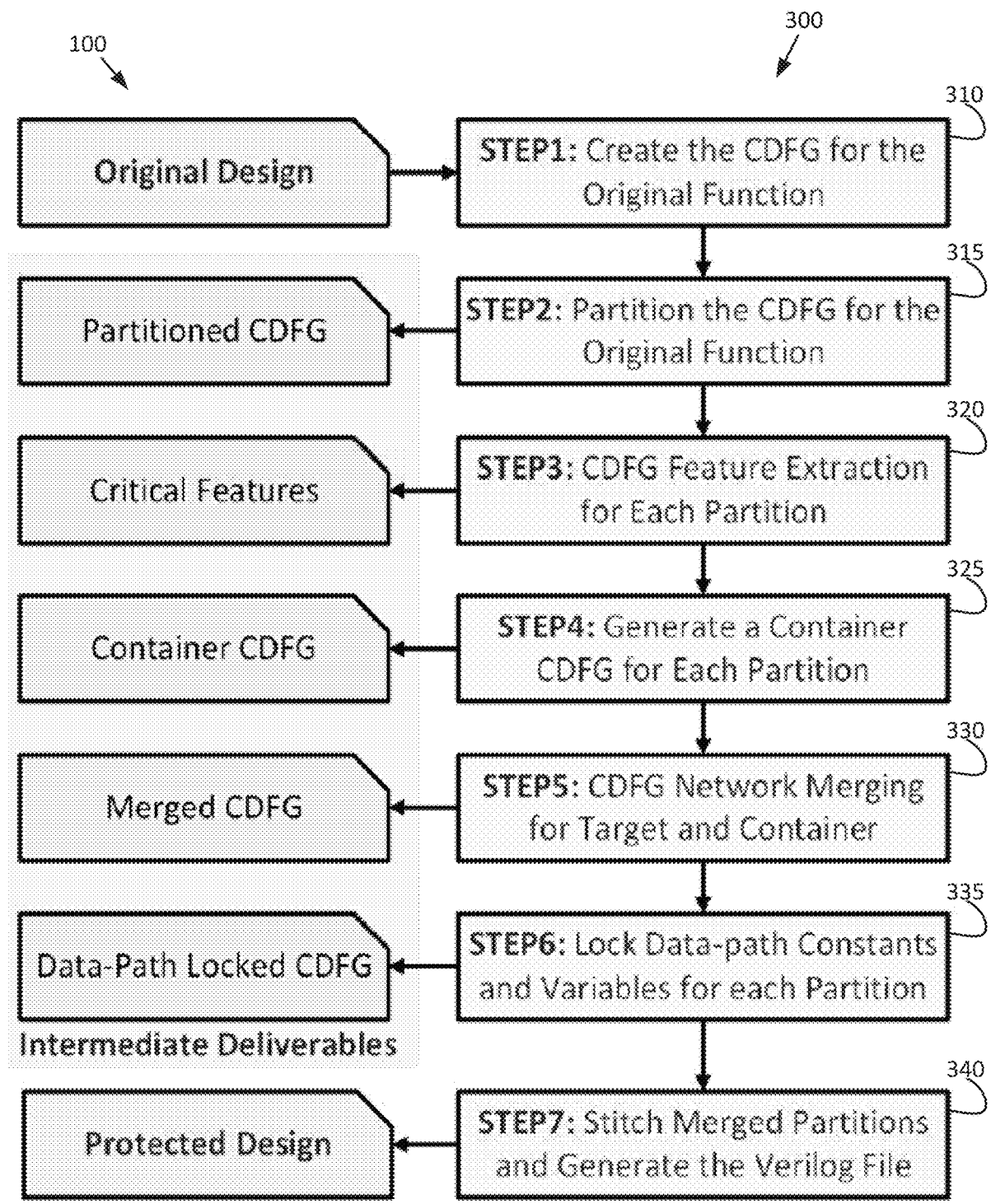
Figure 4:
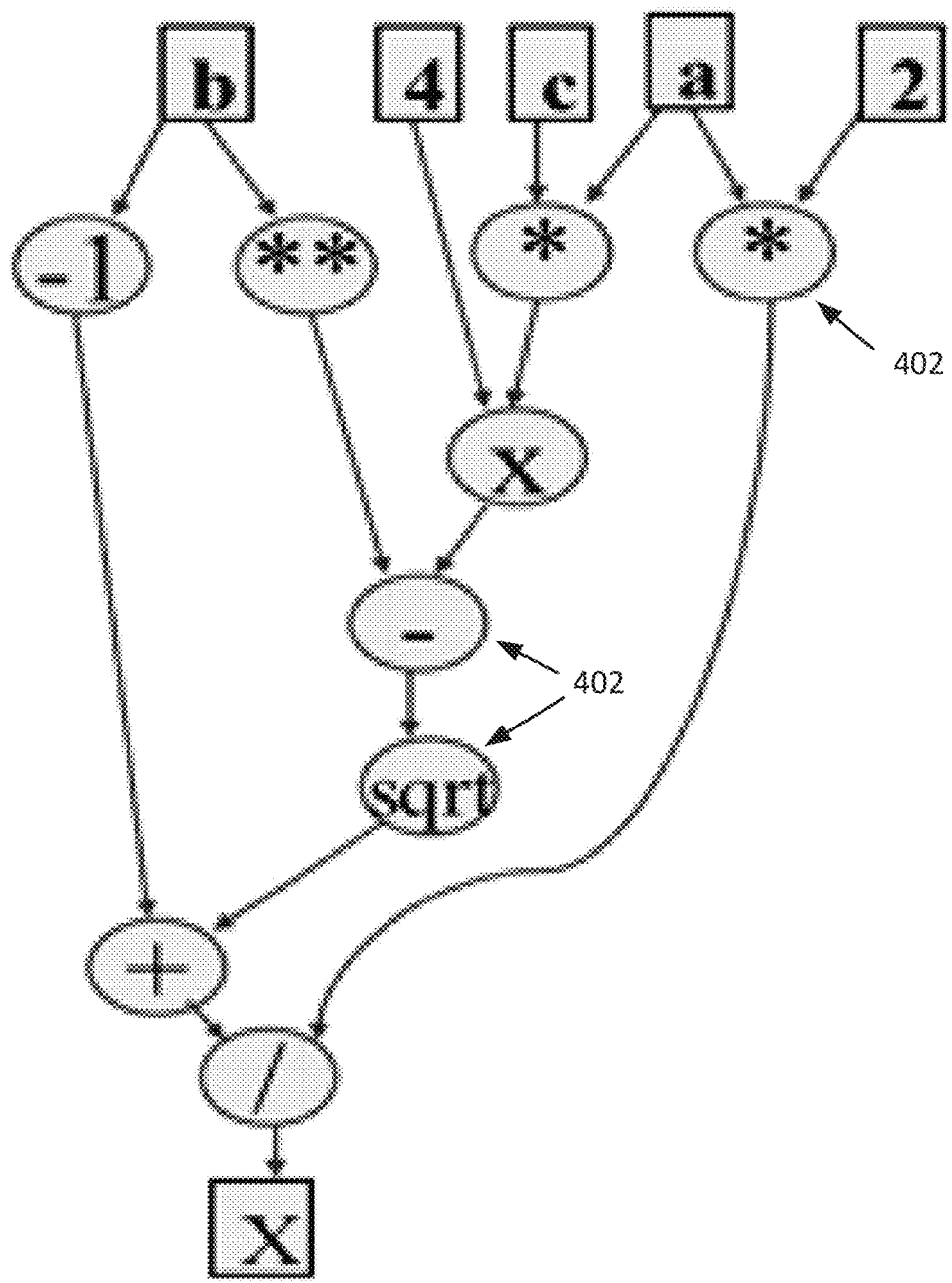
Figure 5:
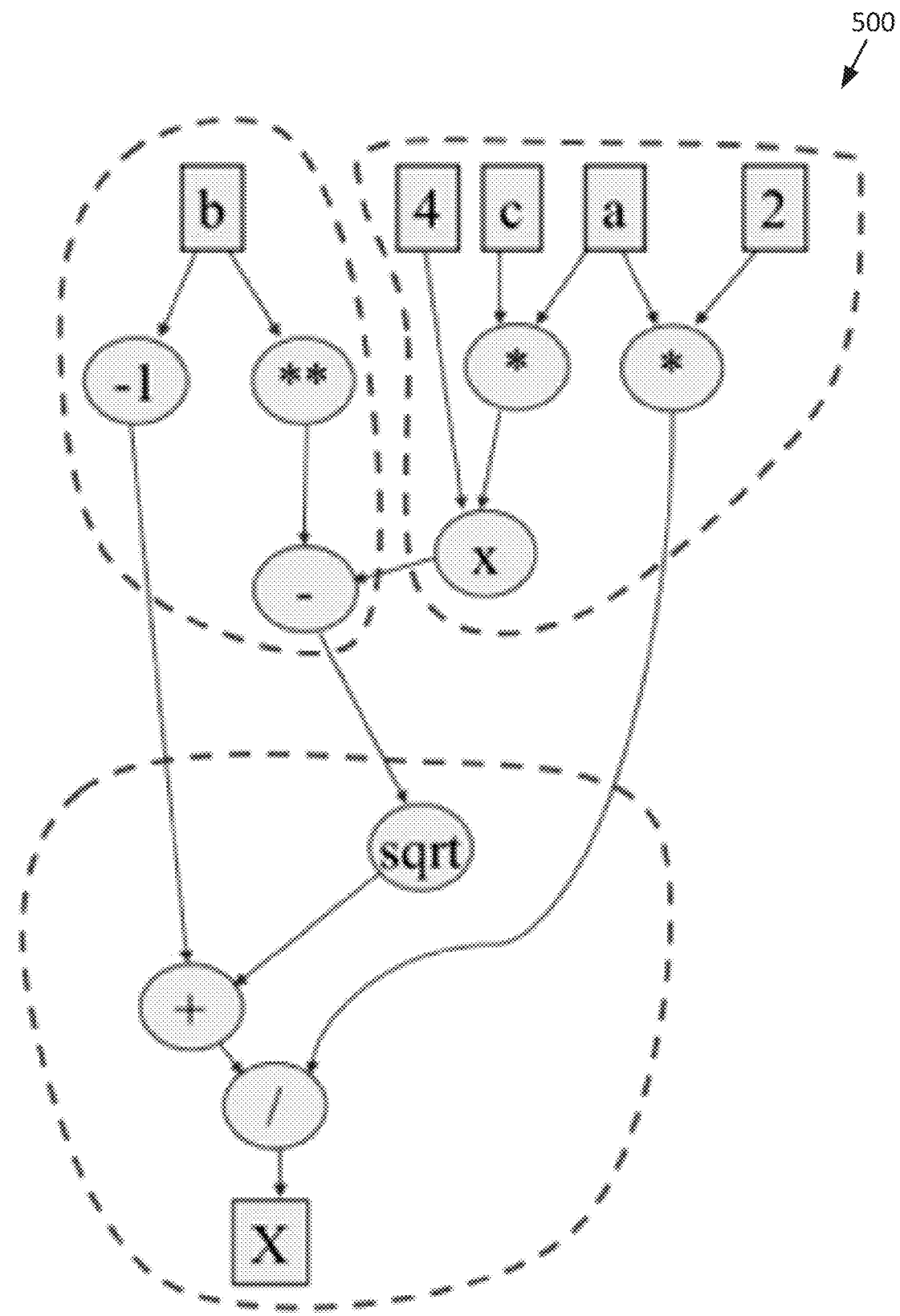
Figure 6C:
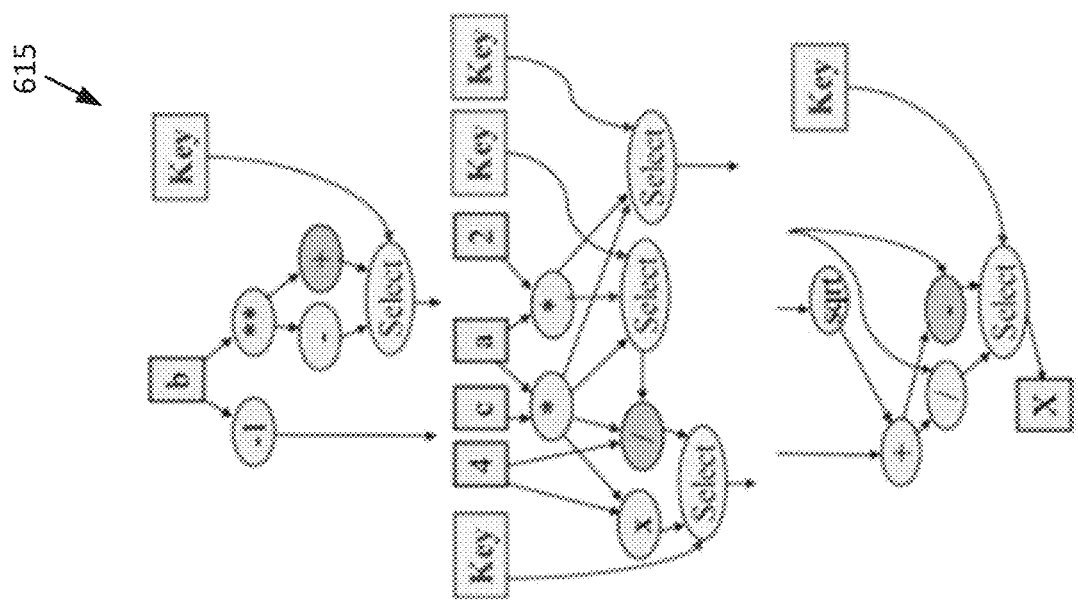
Figure 6B:
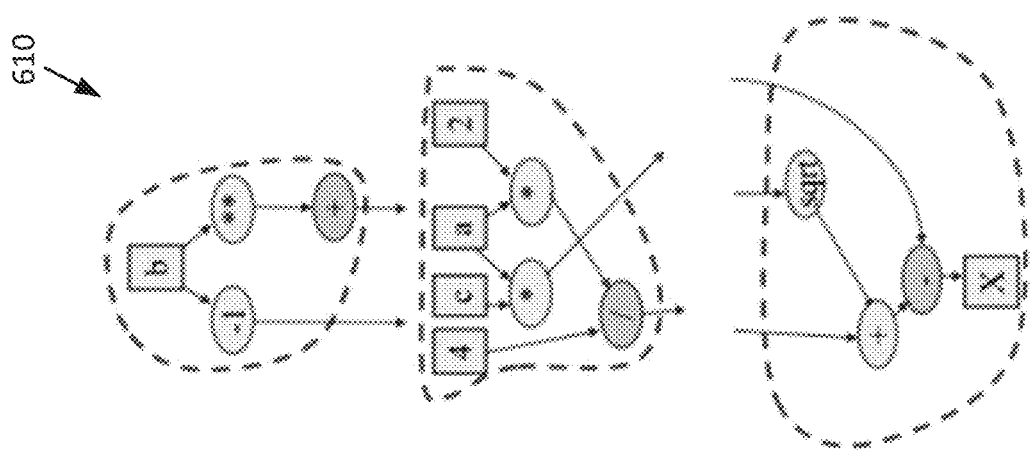
Figure 6A:
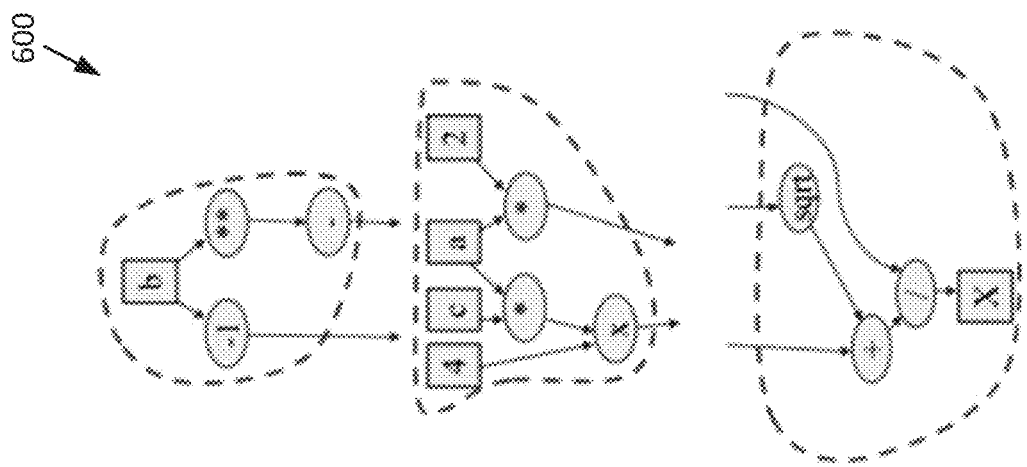
Figure 7:
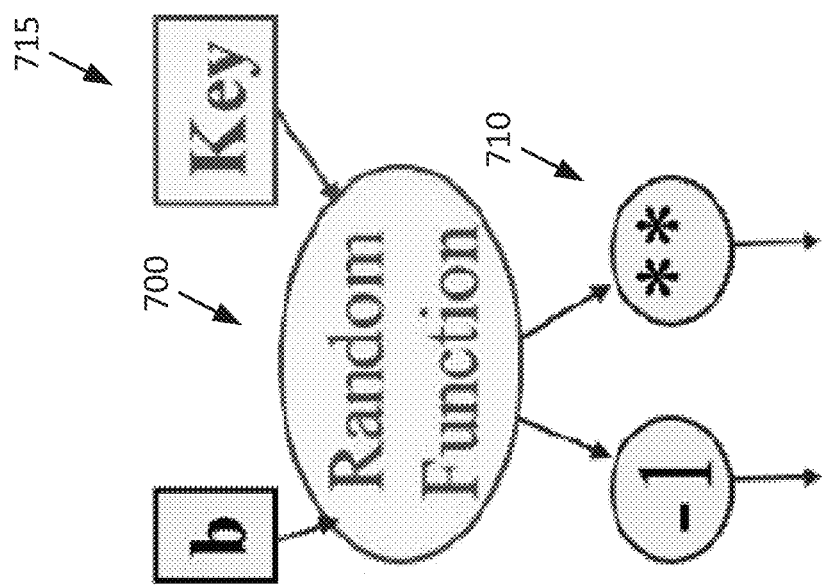
Figure 7:
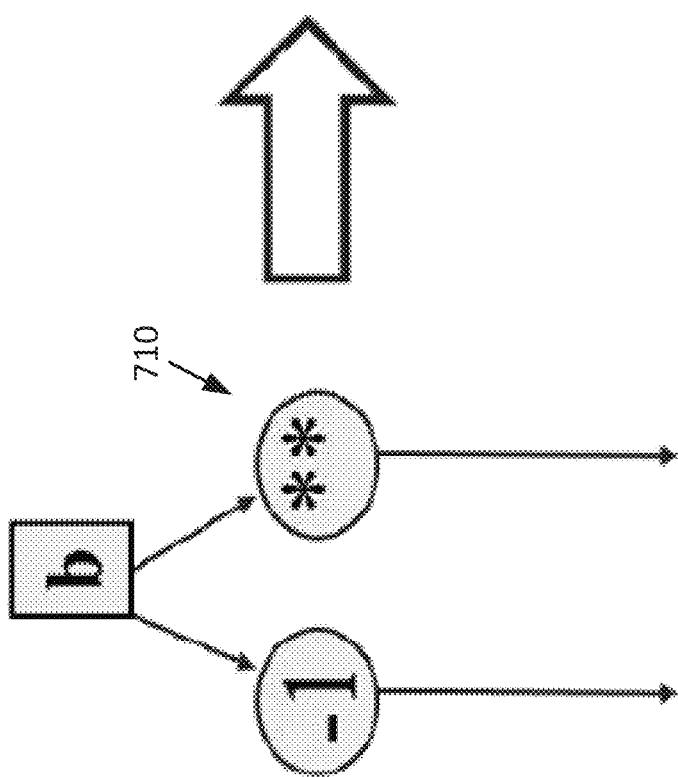
Figure 8:
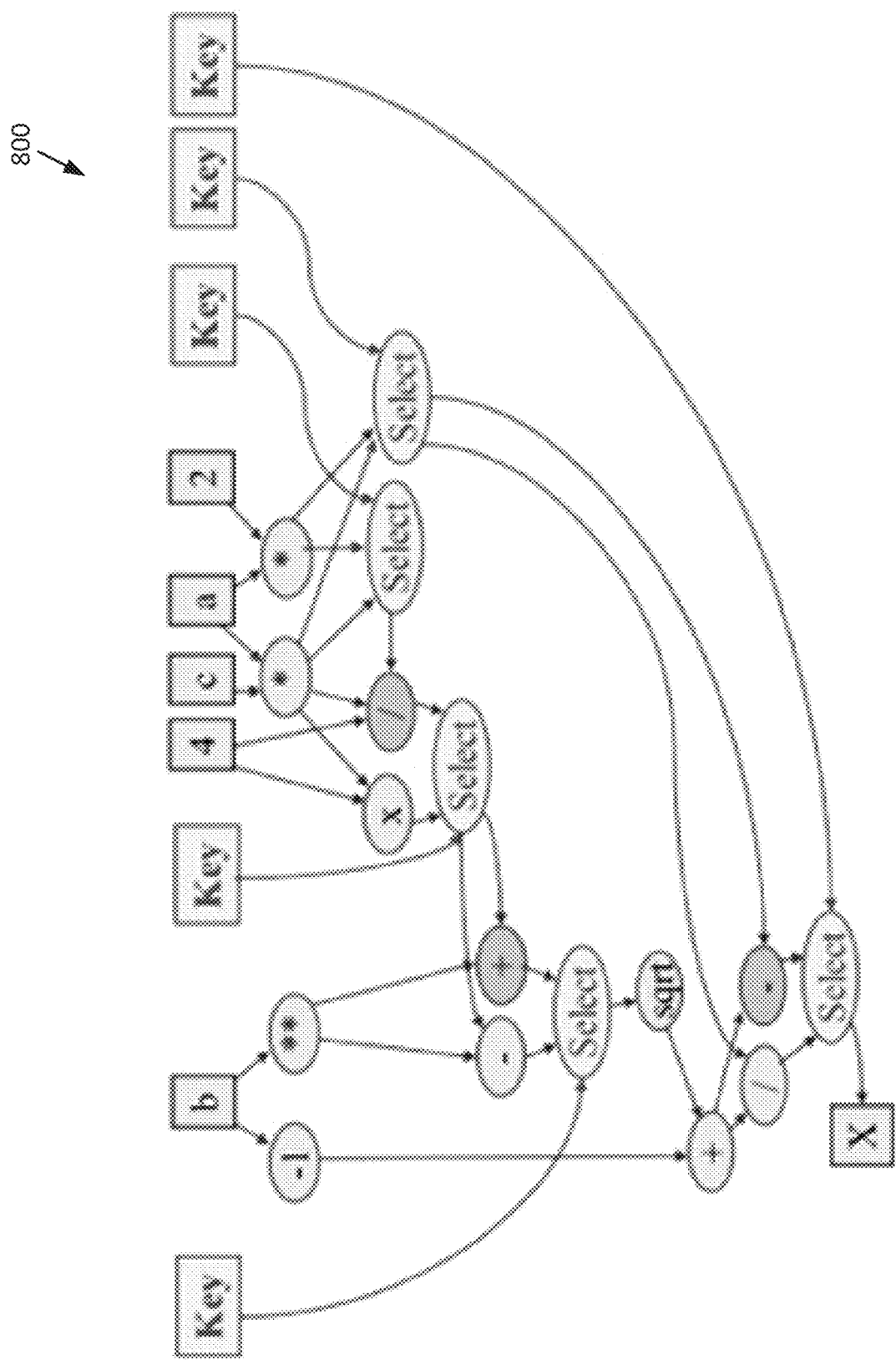
Figure 9:
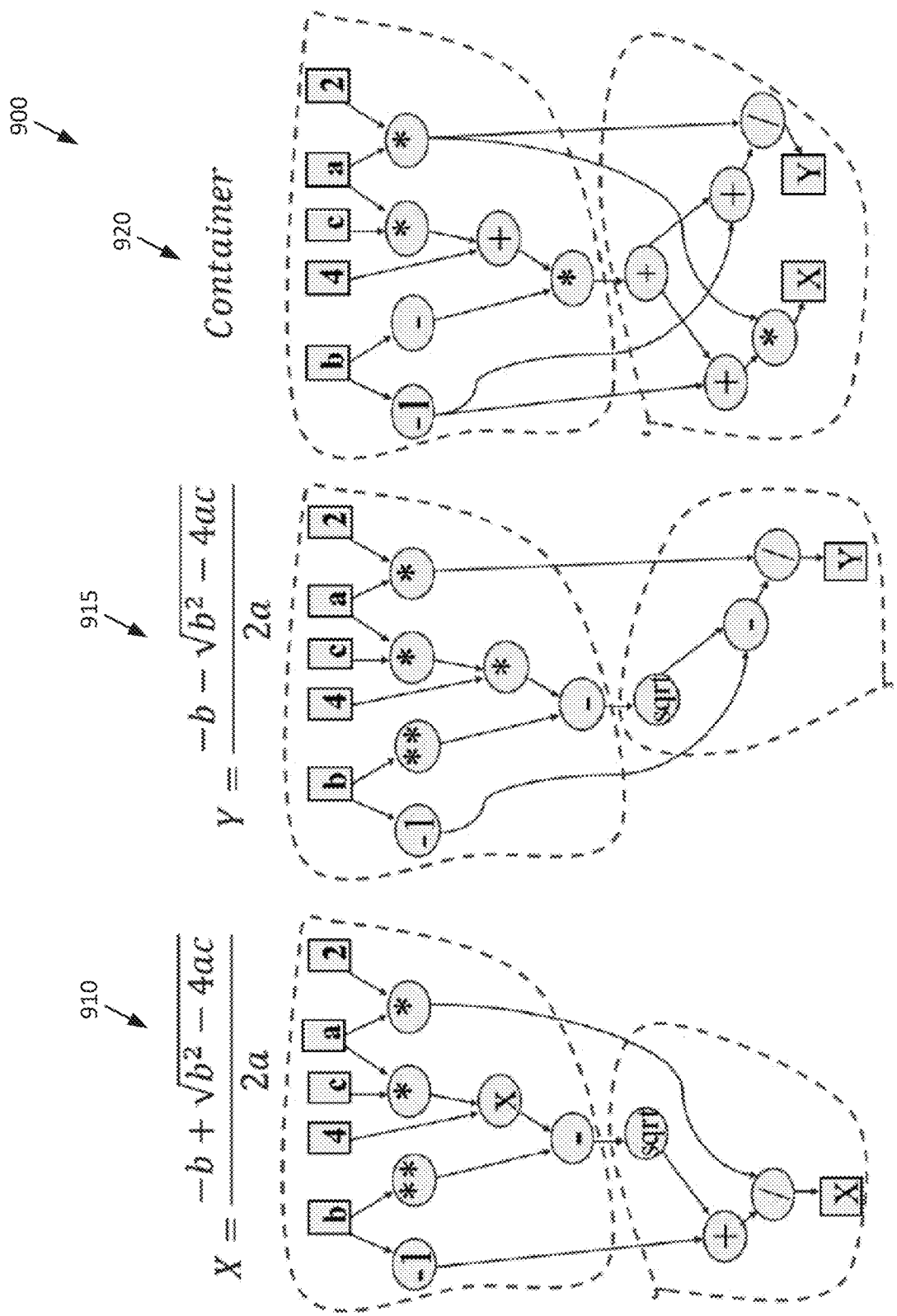
Figure 10:
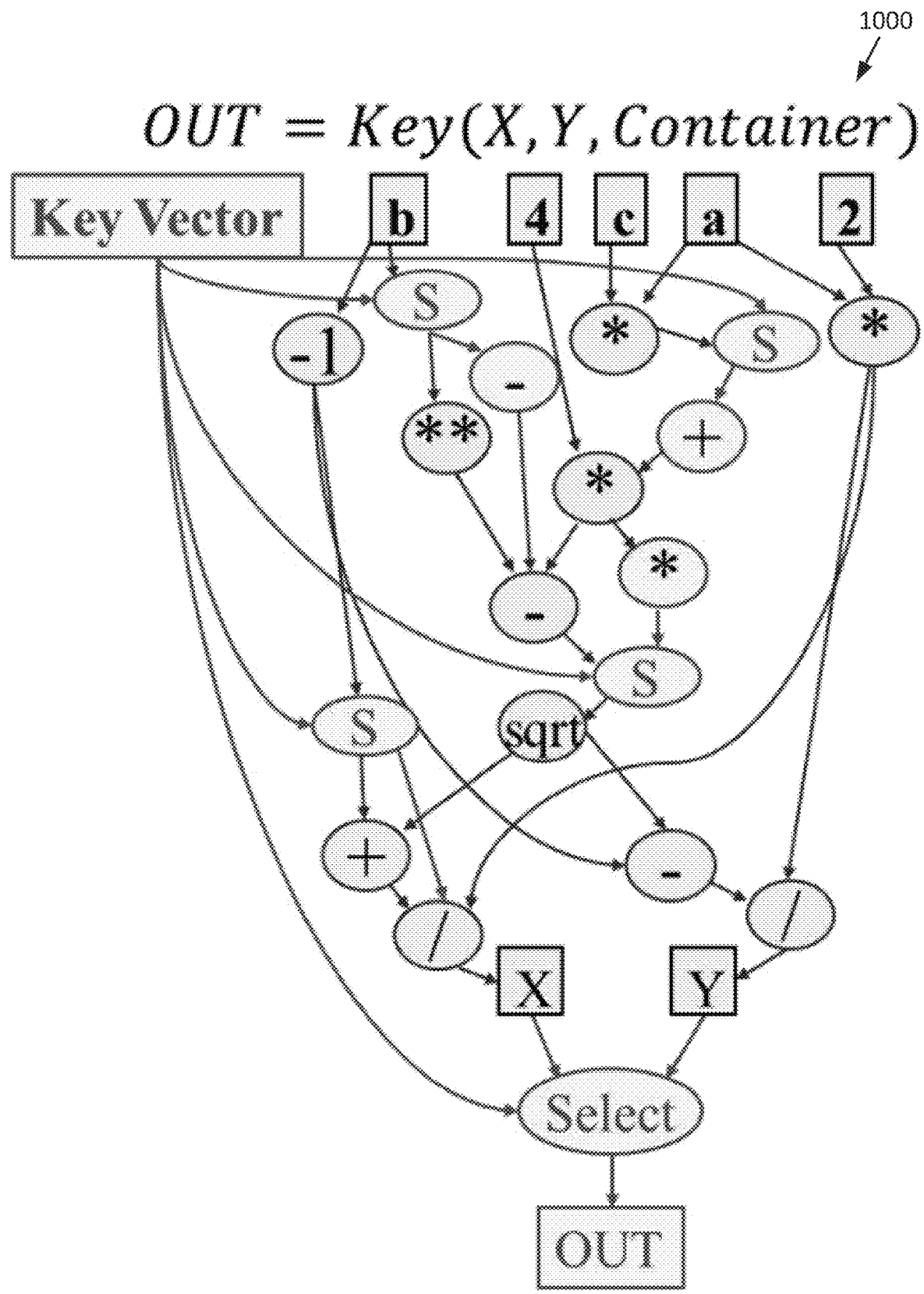

Having thus described the disclosure in general terms, reference will now be made to the accompanying drawings, which are not necessarily drawn to scale, and wherein:

FIG. 1 displays the major security issues spanning the life cycle of hardware IP;

FIG. 2 is a schematic of a computing entity that may be used in conjunction with various embodiments of the present disclosure;

FIG. 3 provides a process flow for merging an original (target) hardware IP with a randomly generated hardware IP (container) in accordance with various embodiments of the present disclosure;

FIG. 4 provides an example illustration of a control data flow graph for a mathematical function;

FIG. 5 provides an example illustration of the partitioned control data flow graph shown in FIG. 4;

FIGS. 6A, 6B, and 6C provide an example of a graphical representation of target partitions in accordance with various embodiments of the present disclosure;

FIG. 7 provides an example of a data-path variable being locked using a key-dependent random function in accordance with various embodiments of the present disclosure;

FIG. 8 provides an example illustration of a key-protected control data flow graph in accordance with various embodiments of the present disclosure;

FIG. 9 provides an example of multi-functionality support in accordance with various embodiments of the present disclosure; and FIG. 10 provides an example illustration of a key-protected control data flow graph supporting multiple target functions in accordance with various embodiments of the present disclosure.

DETAILED DESCRIPTION OF VARIOUS EMBODIMENTS

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. The following brief definition of terms shall apply throughout the application.

The term "comprising" means including, but not limited to, and should be interpreted in the manner it is typically used in the patent context. The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment). If the specification describes something as "exemplary" or an "example," it should be understood that refers to a non-exclusive example; The terms "about" or "approximately" or the like, when used with a number, may mean that specific number, or alternatively, a range in proximity to the specific number, as understood by persons of skill in the art field.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

General Overview of Various Embodiments

Various embodiments of the disclosure are directed to combating security threats using a novel framework involving steganography of hardware IP designs. In various embodiments, the framework may be referred to as a Steganography of Hardware IPs (STIP) framework. Accordingly, in various embodiments, the framework involves locking a hardware IP described in a representation of a design of the hardware IP such as Register Transfer Level (RTL) or gate-level netlist and alter its functional and structural properties when in a locked mode.

In particular embodiments, an original (target) function of a hardware IP design is transformed into its Control Data Flow Graph (CDFG) that is used to perform a hypergraph partitioning algorithm. Each partition (CDFG sub-graph) is then merged with a generated container sub-graph. For instance, in particular embodiments, the merging process is performed using a network combining algorithm, and a key dependency logic is added to allow for switching between the target and the container sub-graphs. Additionally, in particular embodiments, the framework involves performing a data-path locking technique that targets constants and variables in the design. Accordingly, in various embodiments, the overall resultant hardware IP (e.g., circuit) includes a hybrid function that incorporates both the target and the container functions.

As discussed further herein, various embodiments of the disclosure provide several technical advantages that include: transforming the target hardware IP (e.g., circuit) into its CDFG equivalent; performing a hypergraph partitioning algorithm to generate partitioned CDFG sub-graphs of the target function; generating container CDFG sub-graphs, where each container CDFG sub-graph is merged with a corresponding partitioned CDFG sub-graph; applying a network merging process to combine each target CDFG sub-graph with its corresponding container CDFG sub-graph; and/or performing a data-path locking mechanism to corrupt the constants and variables in the target design using key-based random functions.

General Overview of Security Approaches

The move to a distributed supply-chain to address challenges in semiconductor design process has given rise to many critical security issues. FIG. 1 shows examples of major security issues spanning the life cycle of hardware IP 100. A large body of work has addressed various hardware IP security issues, such as Trojans, RE, counterfeiting, and piracy. Though there exist several approaches that lock sequential and combinational portions of the design, they have been shown to be vulnerable to state-of-the-art attacks. To address the limitations of these function locking approaches, various embodiments of a framework are described herein that provide a novel approach to transform a target design for a hardware IP into a CDFG format, and to merge the transformed design with a container function. Accordingly, various embodiments of the framework are able to protect the original functionality against a multitude of functional and structural attacks due to the nature of the transformation performed to the target design. A brief description of various security approaches is now provided as a backdrop for the discussion of various embodiments of the framework provided herein.

Locking Methods:

Different locking methods have been introduced, starting from a basic inverting logic, where XOR/XNOR gates are used as locking key-gates, to more advanced rerouting mechanisms, such as multiplexers and switch boxes. Moreover, a one-way functional-stripping operation can be implemented with a key-input that is used to restore the functionality. Such a technique is used in a Stripped-Functionality Logic Locking (SFLL) process.

Location Selection Techniques:

A vital step of the locking process is the selection of appropriate locations to insert the locking logic. The basic approach is to select locations at random, which is implemented in Ending Piracy in Integrated Circuits (EPIC). Other selection approaches include (1) logic cone size method (CS), which looks for nets with large fan-in and fan-out logic cones, and (2) Secure Logic Locking (SLL), which focuses on eliminating muting and masking key-gates in order to mitigate key-sensitization attacks.

Attacks on Obfuscation:

Alongside locking techniques, a number of powerful attacks and security evaluation tools have been introduced in the literature. Attacks vary in the type of analysis they do. Some of them require an unlocked circuit to observe the original functional behavior, while others require prior knowledge about the locking algorithm used. A summary of the attacks is shown in Table 1.

TABLE 1

A Summary of Potent Attacks on Obfuscated Circuits

| Attack | Type | Unlocked Design | Locking Algorithm | Key Size | Attack Confidence |
| --- | --- | --- | --- | --- | --- |
| SAT* | Functional | Required | Not Required | Full | Exact |
| AppSAT* | Functional | Required | Not Required | Full | Approx. |
| Removal | Strutural | Required | Not Required | Partial | Exact |
| Bypass | Strutural | Required | Not Required | Partial | Approx. |

TABLE 1-continued

A Summary of Potent Attacks on Obfuscated Circuits

| Attack | Type | Unlocked Design | Locking Algorithm | Key Size | Attack Confidence |
|---|---|---|---|---|---|
| KSA | Functional | Required | Not Required | Partial | Exact |
| Hill-Climbing | Functional | Required | Not Required | Full | Approx. |
| SWEEP | Strutural | Not Required | Required | Partial | Approx. |
| SAIL | Strutural | Not Required | Required | Partial | Approx. |

*SAT solvers cannot break designs with complex arithmetic operations.

Boolean Satisfiability Attack—

The Boolean satisfiability attack (SAT) is one of the most impactful attacks, in various example scenarios. It integrates a satisfiability algorithm (SAT-solver) that can find distinguishing input patterns (DIPs). The attack is limited to circuits that are solvable using SAT algorithms, as it is not able to break circuits that contain SAT-hard functions (such as multipliers). Mitigation techniques including SARLock and Anti-SAT have been proposed to mitigate SAT attacks. By introducing a comparison function that forces the attack to eliminate small key-classes per iteration, the added locking mechanisms are able to force the SAT-solver to brute-force the key combinations, which adds complexity to the attack. However, these mitigation techniques have been proven to be vulnerable to multiple attacks, such as removal, bypass, and AppSAT. More specifically, the AppSAT attack targets locking techniques with low output corruptibility when the circuit is in the locked mode. The attack offers "approximate keys" that restore the function of the locked circuit.

Key Sensitization Attack (KSA)—

The key sensitization attack (KSA) is developed to leak the correct value of a key input to a primary output. The attack requires the locked gate-level netlist and a set of oracles, as it analyzes input patterns that can cause the key value to propagate to an output port by leveraging key-gates that mute other key-gates and mask their effect. The major limitation of this attack is scalability, as finding input patterns that can sensitize the correct key values requires exponential time.

Functional Hill-Climbing Attack—

The functional hill-climbing attack is an optimization approach that treats the key-inputs as the parameters. The attack starts by assigning an initial key value that is selected randomly. A functional analysis using this key is performed, and the key is slightly updated. A comparison between the functional behavior of the initial and updated keys is performed, and the key with a higher functional matching is kept. This process iterates until the full functionality is restored.

Constant Propagation Attack—

The constant propagation attack is an attack that analyzes individual key-input ports in the locked circuit. The attack is oracle-less, as it does not require access to the unlocked function. However, the attack requires a training-set of locked circuits that are obfuscated using the same technique of the target circuit. The constant propagation attack is able to establish a correlation between the observed structural properties of the circuit and the correct key values. In some examples, the constant propagation attack may be referred to as SWEEP.

Structural Analysis Using Machine Learning Attack—

Structural analysis machine learning (SAIL) is a machine learning structural analysis attack on combinational logic locking. Similar to the constant propagation attack, the SAIL attack does not require oracles, but a dataset of locked designs using a similar technique to the target circuit is needed. The attack's goal is to restore the locked netlist to its pre-synthesis state by performing a sub-graph restoration prediction. SAIL is developed to target XOR/XNOR key-gates.

Computer Program Products, Systems, Methods, and Computing Entities

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language, such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD- ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of a data structure, apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

Exemplary Computing Entity

FIG. 2 provides a schematic of a computing entity 200 that can be used in conjunction with various embodiments of the present disclosure. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

Although illustrated as a single computing entity, those of ordinary skill in the art should appreciate that the computing entity 200 shown in FIG. 2 may be embodied as a plurality of computing entities, tools, and/or the like operating collectively to perform one or more processes, methods, and/or steps. As just one non-limiting example, the computing entity 200 may comprise a plurality of individual data tools, each of which may perform specified tasks and/or processes.

Depending on the embodiment, the computing entity 200 may include one or more network and/or communications interfaces 225 for communicating with various computing entities, such as by communicating data, content, information, and/or similar terms used herein interchangeably that can be transmitted, received, operated on, processed, displayed, stored, and/or the like. Thus, in certain embodiments, the computing entity 200 may be configured to receive data from one or more data sources and/or devices, as well as receive data indicative of input, for example, from a device.

The networks used for communicating may include, but are not limited to, any one or a combination of different types of suitable communications networks, such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks may have any suitable communication range associated therewith and may include, for example, global networks (e.g., the Internet), MANs, WANs, LANs, or PANs. In addition, the networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

Accordingly, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 200 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The computing entity 200 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

In addition, in various embodiments, the computing entity 200 includes or is in communication with one or more processing elements 210 (also referred to as processors, processing circuitry, and/or similar terms used herein interchangeably) that communicate with other elements within the computing entity 200 via a bus 230, for example, or network connection. As will be understood, the processing element 210 may be embodied in several different ways. For example, the processing element 210 may be embodied as one or more complex programmable logic devices (CPLDs), microprocessors, multi-core processors, coprocessing entities, application-specific instruction-set processors (ASIPs), and/or controllers. Further, the processing element 210 may be embodied as one or more other processing devices or circuitry. The term circuitry may refer to an entirely hardware embodiment or a combination of hardware and computer program products. Thus, the processing element 210 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 210 may be configured for a particular use or configured to execute instructions stored in volatile or non-volatile media or otherwise accessible to the processing element 210. As such, whether configured by hardware, computer program products, or a combination thereof, the processing element 210 may be capable of performing steps or operations according to embodiments of the present invention when configured accordingly.

In various embodiments, the computing entity 200 may include or be in communication with non-volatile media (also referred to as non-volatile storage, memory, memory storage, memory circuitry and/or similar terms used herein interchangeably). For instance, the non-volatile storage or memory may include one or more non-volatile storage or memory media 220 such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media 220 may store files, databases, database instances, database management system entities, images, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium.

In particular embodiments, the memory media 220 may also be embodied as a data storage device or devices, as a separate database server or servers, or as a combination of data storage devices and separate database servers. Further, in some embodiments, the memory media 220 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. As already discussed, various embodiments contemplated herein use data storage in which some or all the information/data required for various embodiments of the invention may be stored.

In various embodiments, the computing entity 200 may further include or be in communication with volatile media (also referred to as volatile storage, memory, memory storage, memory circuitry and/or similar terms used herein interchangeably). For instance, the volatile storage or memory may also include one or more volatile storage or memory media 215 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media 215 may be used to store at least portions of the databases, database instances, database management system entities, data, images, applications, programs, program modules, scripts, source code, object code, byte code, compiled code, interpreted code, machine code, executable instructions, and/or the like being executed by, for example, the processing element 210. Thus, the databases, database instances, database management system entities, data, images, applications, programs, program modules, scripts, source code, object code, byte code, compiled code, interpreted code, machine code, executable instructions, and/or the like may be used to control certain aspects of the operation of the computing entity 200 with the assistance of the processing element 210 and operating system.

Although not shown, the computing entity 200 may include or be in communication with one or more input elements, such as a keyboard input, a mouse input, a touch screen/display input, motion input, movement input, audio input, pointing device input, joystick input, keypad input, and/or the like. The computing entity 200 may also include or be in communication with one or more output elements (not shown), such as audio output, video output, screen/display/interface output, motion output, movement output, and/or the like.

As will be appreciated, one or more of the computing entity's components may be located remotely from other computing entity components, such as in a distributed system. Furthermore, one or more of the components may be aggregated and additional components performing functions described herein may be included in the computing entity 200. Thus, the computing entity 200 can be adapted to accommodate a variety of needs and circumstances.

Exemplary System Operation

The logical operations described herein may be implemented (1) as a sequence of computer implemented acts or one or more program executables or modules running on a system and/or (2) as interconnected machine logic circuits or circuit modules within the system. The implementation is a matter of choice dependent on the performance and other requirements of the system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

STIP Module

Various embodiments of the framework are configured to perform a merge process that intelligently combines a hardware IP for an original (target) function with a generated hardware IP (container). Accordingly, in particular embodiments, the merged parts of the hardware IP can be controlled by a key-based selection process, where only the correct key allows for the original target hardware IP to be activated. Turning now to FIG. 3, additional details are provided regarding a process flow for merging an original (target) hardware IP with a generated hardware IP container according to various embodiments. For example, the hardware IP may be circuit. FIG. 3 is a flow diagram showing a STIP module for performing such functionality according to various embodiments of the disclosure. For example, the flow diagram shown in FIG. 3 may correspond to operations carried out by a processing element 210 and memories 215, 220 of the computing entity 200, as it executes the STIP module. That is, generally, steps/operations of the process flow 300 may be performed by the computing entity 200. In some embodiments, the computing entity 200 is generally configured for hardware IP designing and modification.

The process flow 300 begins with the STIP module converting a representation of a design of the target hardware IP (target design) such as a register-transfer level (RTL) or gate-level netlist to generate a control and data flow graph (CDFG) for the target design in Step/Operation 310. For instance, in particular embodiments, the STIP module may be configured to parse the representation (e.g., the RTL) and transform concurrent blocks of the RTL code into a CDFG data structure.

FIG. 4 shows an example illustration of a CDFG representation 400 of an example mathematical function 410. As shown, the CDFG representation 400 describes the flow of inputs (e.g., b, 4, c, a, 2) and the sub-functions 402 performed (e.g., multiplication, subtraction, square root) in order to arrive at an output (e.g., X). Accordingly, the CDFG representation of the target design in various embodiments enables intelligent and efficient functional and structural analysis of the target design.

Next, the STIP module partitions the CDFG representation 400 of the target design into a set of partitioned CDFG sub-graphs in Step/Operation 315. Here, in particular embodiments, the STIP module may be configured to employ a partitioning algorithm to perform the partitioning of the CDFG representation that is optimized to minimize the cut edges. Once the CDFG representation of the target design has been partitioned into sub-graphs, the STIP module performs a thorough analysis of each partitioned CDFG sub-graph to determine one or more structural and/or one or more functional features in Step/Operation 320. As a result, in particular embodiments, a set of critical features for the target design's CDFG representation is generated in a report, where these features are to be used to guide the generation of the container's CDFG representation. For example, such features may include the types of operations, the number of possible branches, and/or the number of constants and variables integrated in the graph.

The STIP module then performs an automatic CDFG generation process for each partitioned CDFG sub-graph to generate a set of container CDFG sub-graphs for the set of partitioned CDFG sub-graphs in Step/Operation 325, where basic parameters are guided by the outcome of the previous step/operation. For instance, in some embodiments, the STIP module is configured to generate a container CDFG sub-graph for a partitioned CDFG sub-graph to match the size and depth of the target design's original or non-partitioned CDFG representation 400, and to match the number of inputs and outputs of both functions. Depending on the embodiment, various types of container CDFG representations can be used to generate the container CDFG sub-graphs. For example, a set of possible containers that can be used include randomly generated CDFG representations, slightly modified target CDFG representations, CDFG representations that are retrieved from one or more data storages (e.g., a database, repository, and/or file), and/or the like.

At this point, the STIP module generates a set of merged CDFG sub-graphs in Step/Operation 330 by merging each partitioned CDFG sub-graph with its corresponding container CDFG sub-graph using a merging algorithm to generate a corresponding merged CDFG sub-graph. For example, in particular embodiments, the merging algorithm may be a K-way graph merging algorithm. Accordingly, a K-way graph merging algorithm may work efficiently for smaller-sized graphs, where a high quality deeply merged graph can be generated in a timely manner. Alongside the merging process, the STIP module may implement a key-based selector in particular embodiments to allow for choosing whether to activate the target or the container portion. For example, in some embodiments, the key is taken from a primary input port, where it is stored and managed using a secure and tamper-resistant media. Additionally, derived keys can also be implemented in some embodiments, where functions at the end of each partition regenerate a unique key based at least in part on the inserted key. Integrating derived keys can help distribute secret keys in large circuits, which can help alter the structure-representation of the hardware IP, and enabled control over the size of the key input ports.

In addition to the control-path modification, the STIP module in various embodiments implements data-path locking in Step/Operation 335. Such a modification can help hide constants and mask variables when the function is in the locked mode. Accordingly, the STIP module may be configured in particular embodiments to perform the data-path locking by adding key dependency on one or more exiting values, where the original values are restored only if the key is correctly applied. Finally, the STIP module synthesizes the modified hardware IP using the set of merged CDFG sub-graphs in Step/Operation 340. Here, in particular embodiments, the STIP module may be configured to use a set of user-defined constraints that can help control and balance the performance properties of the modified hardware IP.

Example Implementation According to Various Embodiments

A demonstrative example of performing the merging of an original (target) hardware IP with a generated hardware IP (container) via the STIP framework according to various embodiments is now described. As discussed, the STIP framework may be performed by a computing entity 200 to merge an original hardware IP with a generated container hardware IP. In various embodiments, the computing entity 200 includes means, including processing element 210, memories 215, 220, and/or the like, for performing steps/operations of the STIP framework, such as the ones demonstrated in FIGS. 4-10. Here, the example involves applying the STIP framework according to various embodiments to the mathematical function shown in FIG. 4. Accordingly, the function has been constructed as a CDFG representation (e.g., graph), and partitioned to smaller sub-graphs. FIG. 5 shows examples of partitioned CDFG representations 500. As shown, each partitioned CDFG representation 500 may include various constants, variables, operations or sub-functions 402, flow branches, and/or the like.

An analysis of the critical features of the function is performed. These critical features are then used in particular embodiments to guide the generation of a container CDFG representation, where a similar (dummy) CDFG representation is constructed. Accordingly, in some embodiments, the number of reusable paths and operators depends on the level of change between the two CDFG representations. An example of the container CDFG representations (sub-graphs) 610 for the partitions 600 of the CDFG representation is shown in FIGS. 6A and 6B. In particular embodiments, a tradeoff may be overhead, where more changes results in more branches and operators being implemented. In the illustrated embodiment, overhead may be minimally increased with the changes between the partitions 600 and the container sub-graphs 610 primarily involve replacement of different operations or sub-functions (e.g., multiplication changed to division).

Then, as previously described, a merging algorithm is used to combine both CDFG representations (sub-graphs) 600, 610 into a hybrid representation 615 (merged sub-graph) that can perform both functions, as generally shown in FIG. 6C. FIG. 7 also illustrates an example of such a modification, where the random function 700 can be any arithmetic or cryptic operation that can restore the original data-path functionality 710 when the correct key 715 is applied. The final protected CDFG representation 800 is shown in FIG. 8.

As demonstrated in FIGS. 6A and 6B, the generated container CDFG representations 610 are almost identical to the partitions 600 of the CDFG representation, which can help increase the efficiency of the merging process in various embodiments. Accordingly, in particular embodiments, more modifications can also be implemented in order to increase the level of alteration between the original and the protected designs. For each partition, the merged CDFG representation in various embodiments results in two different outputs, one for the target function, and another for the container function. Thus, to implement the locking mechanism in particular embodiments, a key-controlled selection function may be placed at the end of each modification in the CDFG representation, where both the modified and original parts are fed into this selector. Based at least in part on the key value, the final output may either be the original function, or the dummy one. To further enhance the performance of the merged CDFG representation in some embodiments, the selector can also be placed before the divider, which can allow for a more efficient implementation. In this example, only a single modification per partition was performed. However, in various embodiments, the number of modifications and the size of the key can be increased to allow for a wide range of possibilities and design transformation options.

Multi-Function Support

An additional feature provided by various embodiments of the STIP framework is to allow for multi-functionality support. In these embodiments, instead of merging a target function with a container, multiple target functions may be merged with the container. Such merging can allow for the activation of each function when the corresponding key is applied. Accordingly, the container partitions in these instances can be generated in various embodiments to combine the graphical features of all supported functions, where specific path trees and graph depth levels can be configured as similar to the largest corresponding sub-graph of each function. An example of multi-functionality support 900 according to various embodiments is shown in FIG. 9.

Here, the merging process of the multiple functions 910, 915 can be performed at multiple stages, starting with the container 920. For instance, the first function 910 may be merged to the container 920, then the activation key for the first function 910 may be generated. Then, the second function 915 may be merged to the accumulated container 920, and this process keeps filling the container 920 with all available target functions. Finally, a fully merged function that allows for the activation of all target functions is generated. In order to activate a specific function, the corresponding key needs to be applied. In some embodiments, the merged CDFG representation may be configured so that no more than one target function can run at a time. An example of the merged CDFG representation 1000 of two container functions is shown in FIG. 10.

Security Analysis and Metrics

In addition, the framework may be configured in various embodiments so that the CDFG merging process can be evaluated by measuring the level of similarity between two graphs. Specifically, in particular embodiments, a version of a graph matching evaluation can be conducted. Since the STIP framework in various embodiments generates the container's CDFG representation based at least in part on the target hardware IP's CDFG representation, the number of modified branches and operators may be known and can be used to perform an accurate graph matching evaluation. For instance, the level of similarity between the two CDFG representations can be calculated in particular embodiments using Equation 1 as follows:

$$Similarity_{index} = \left[1 - \frac{branches_{modified} + operators_{modified}}{branches_{original} + operators_{original}}\right] * 100\% \quad \text{Equation 1}$$

In Equation 1, $Similarity_{index}$ represents the approximate percentage of graph similarity, $branches_{modified}$ represents the total number of modified CDFG branches, and $branches_{total}$ represents the total number of branches in the target function. Similarly, $operators_{modified}$ represents the total number of modified CDFG operators, and $operators_{total}$ represents the total number of operators in the target CDFG.

In addition to the level of similarity, the wide range of possible CDFG variants (graphs) that can be implemented via the STP framework can be considered in various embodiments. This metric can be beneficial in demonstrating the complexity of restoring the target function from the point of the attacker. Accordingly, in particular embodiments, the number of possible graphs is computed using Equation 2 as follows:

$$Possible_{graphs} = \binom{b}{n} * \binom{p}{k} \quad \text{Equation 2}$$

In Equation 2, $Possible_{graphs}$ represents the total number of possible graphs, n represents the number of modified branches, and b represents the total number of branches in the target CDFG representation. Additionally, the number of possible branch modifications is multiplied by the number of possible operator modifications, where k represents the number of CDFG operator modifications, and p represents the total number of operators in the target CDFG representation.

CONCLUSION

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed, and that modifications and other embodiments are intended to be included within the scope of the appended claims. Although specific terms are employed herein, they are used in a generic and descriptive sense only and not for purposes of limitation.

That which is claimed:

1. A method for modifying a design of a hardware intellectual property (IP), the method comprising:
   generating a control and data flow graph (CDFG) representation for each of one or more functions of the design;
   partitioning the CDFG representation into a set of partitioned sub-graphs;
   for each partitioned sub-graph, generating a merged sub-graph to form a set of merged sub-graphs based at least in part on:
   performing an analysis on the partitioned sub-graph to identify at least one feature of one or more structural features and/or one or more functional features for the partitioned sub-graph,
   generating a container sub-graph for the partitioned sub-graph based at least in part on the at least one feature, and
   merging the partitioned sub-graph and the container sub-graph to generate the merged sub-graph; and
   synthesizing a modified design of the hardware IP, the modified design comprising the set of merged sub-graphs.

2. The method of claim 1, wherein partitioning the CDFG representation comprises using a partitioning algorithm configured to minimize cut edges of the set of partitioned sub-graphs.

3. The method of claim 1, wherein the at least one feature comprises at least one of types of operations, a number of possible branches, or a number of constants and variables integrated in the partitioned sub-graph.

4. The method of claim 1, wherein the container sub-graph comprises at least one of a randomly generated sub-graph, a modification of the partitioned sub-graph, or a sub-graph retrieved from a data storage.

5. The method of claim 1, wherein merging the partitioned sub-graph and the container sub-graph is performed using a K-way graph merging algorithm.

6. The method of claim 1, wherein merging the partitioned sub-graph and the container sub-graph is performed by implementing a key-based selector configured to control activation of functionality represented by the partitioned sub-graph or functionality represented by the container sub-graph.

7. The method of claim 1, wherein merging the partitioned sub-graph and the container sub-graph is performed by implementing one or more derived keys, and functionality represented an end of the partitioned sub-graph regenerates the one or more derived keys based at least in part on an inserted key.

8. The method of claim 1, wherein generating a merged sub-graph is further based at least in part on performing a data-path locking on the merged sub-graph.

9. The method of claim 8, wherein performing the data-path locking on the merged CDFG sub-graph comprises adding a key dependency on at least one existing value so that the at least one existing value is restored only if a key is correctly applied.

10. An apparatus for modifying a design of a hardware intellectual property (IP), the apparatus comprising at least one processor and a memory comprising computer executable instructions, the memory and the computer executable instructions configured to, with the at least one processor, cause the apparatus to:
    generate a control and data flow graph (CDFG) representation for each of one or more functions of the design;
    partition the CDFG representation into a set of partitioned sub-graphs;
    for each partitioned sub-graph, generate a merged sub-graph to form a set of merged sub-graphs based at least in part on:
    perform an analysis on the partitioned sub-graph to identify at least one feature of one or more structural features and/or one or more functional features for the partitioned sub-graph,
    generate a container sub-graph for the partitioned sub-graph based at least in part on the at least one feature, and merge the partitioned sub-graph and the container sub-graph to generate the merged sub-graph; and synthesize a modified design of the hardware IP, the modified design comprising the set of merged sub-graphs.

11. The apparatus of claim 10, wherein partitioning the CDFG representation comprises using a partitioning algorithm configured to minimize cut edges of the set of partitioned sub-graphs.

12. The apparatus of claim 10, wherein the at least one feature comprises at least one of types of operations, a number of possible branches, or a number of constants and variables integrated in the partitioned sub-graph.

13. The apparatus of claim 10, wherein the container sub-graph comprises at least one of a randomly generated sub-graph, a modification of the partitioned sub-graph, or a sub-graph retrieved from a data storage.

14. The apparatus of claim 10, wherein merging the partitioned sub-graph and the container sub-graph is performed using a K-way graph merging algorithm.

15. The apparatus of claim 10, wherein merging the partitioned sub-graph and the container sub-graph is performed by implementing a key-based selector configured to control activation of functionality represented by the partitioned sub-graph or functionality represented by the container sub-graph.

16. The apparatus of claim 10, wherein merging the partitioned sub-graph and the container sub-graph is performed by implementing one or more derived keys, and functionality represented an end of the partitioned sub-graph regenerates the one or more derived keys based at least in part on an inserted key.

17. The apparatus of claim 10, wherein generating a merged sub-graph is further based at least in part on performing a data-path locking on the merged sub-graph.

18. The apparatus of claim 17, wherein performing the data-path locking on the merged CDFG sub-graph comprises adding a key dependency on at least one existing value so that the at least one existing value is restored only if a key is correctly applied.

19. A computer program product for modifying a design of a hardware IP, the computer program product comprising at least one computer-readable storage medium having computer-readable program code portions stored therein, the computer-readable program code portions comprising executable portions configured to cause at least one processor to:

generate a control and data flow graph (CDFG) representation for each of one or more functions of the design;

partition the CDFG representation into a set of partitioned sub-graphs;

for each partitioned sub-graph, generate a merged sub-graph to form a set of merged sub-graphs based at least in part on:

perform an analysis on the partitioned sub-graph to identify at least one feature of one or more structural features and/or one or more functional features for the partitioned sub-graph, generate a container sub-graph for the partitioned sub-graph based at least in part on the at least one feature, and merge the partitioned sub-graph and the container sub-graph to generate the merged sub-graph; and synthesize a modified design of the hardware IP, the modified design comprising the set of merged sub-graphs.

20. The computer program product of claim 19, wherein partitioning the CDFG representation comprises using a partitioning algorithm configured to minimize cut edges of the set of partitioned sub-graphs.

* * * * *